United States Patent
Font

(10) Patent No.: US 6,691,565 B2
(45) Date of Patent: Feb. 17, 2004

(54) STEERING ANGLE SENSOR, SYSTEM, METHOD, AND INCREMENTAL TRACK THEREOF

(75) Inventor: Joachim Font, Sulzbach (DE)

(73) Assignee: Takata-Petri AG, Aschaffenburg (DE)

( * ) Notice: Subject to any disclaimer, the term of this patent is extended or adjusted under 35 U.S.C. 154(b) by 43 days.

(21) Appl. No.: 09/924,424

(22) Filed: Aug. 8, 2001

(65) Prior Publication Data

US 2002/0022913 A1 Feb. 21, 2002

(30) Foreign Application Priority Data

Aug. 11, 2000 (DE) .......................... 100 41 507

(51) Int. Cl.⁷ .............................................. G01M 15/00
(52) U.S. Cl. ..................................... 73/118.1; 73/118.1
(58) Field of Search ........................ 73/118.1, 862, 73/862.08, 1.75, 8; 324/207, 207.25, 207.16, 207.22

(56) References Cited

U.S. PATENT DOCUMENTS

| | | | |
|---|---|---|---|
| 5,027,648 A | * 7/1991 | Filleau | 73/118.1 |
| 5,646,523 A | * 7/1997 | Kaiser et al. | 324/207.2 |
| 5,833,477 A | 11/1998 | Zahn | |
| 6,236,119 B1 | 5/2001 | Bonn et al. | |
| 6,282,968 B1 | * 9/2001 | Sano et al. | 73/862.08 |

FOREIGN PATENT DOCUMENTS

| | | |
|---|---|---|
| DE | 195 06 865 C1 | 2/1995 |
| DE | 195 25 928 C2 | 1/1997 |
| DE | 196 47 705 A1 | 5/1998 |
| DE | 197 58 104 A1 | 7/1999 |

* cited by examiner

Primary Examiner—Evan Pert
Assistant Examiner—Monica D. Harrison
(74) Attorney, Agent, or Firm—Foley & Lardner

(57) ABSTRACT

A steering angle sensor arrangement for determining the steering angle of a steering wheel arrangement has an incremental code track and a sensing device. The code track is assigned to either of a rotatable portion of the steering wheel or a fixed portion. The sensing device for sensing the code track can be assigned to the other assembly. The sensing device generates an incremental signal from which the steering angle can be determined. At the incremental track has at least one reference mark, which modifies the incremental signal for determining the absolute position of the steering wheel.

24 Claims, 10 Drawing Sheets

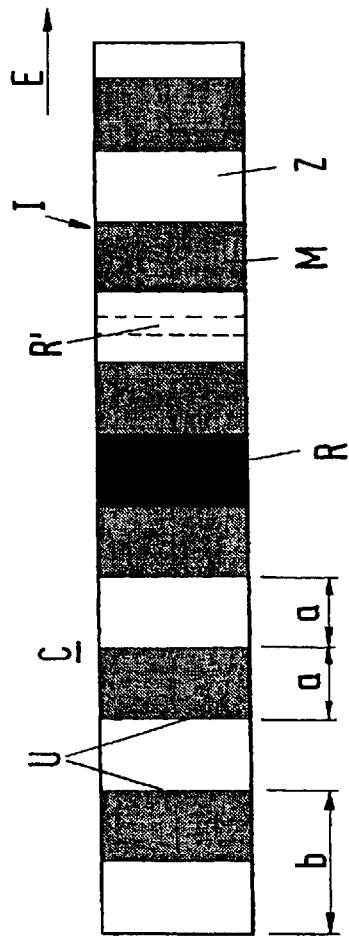

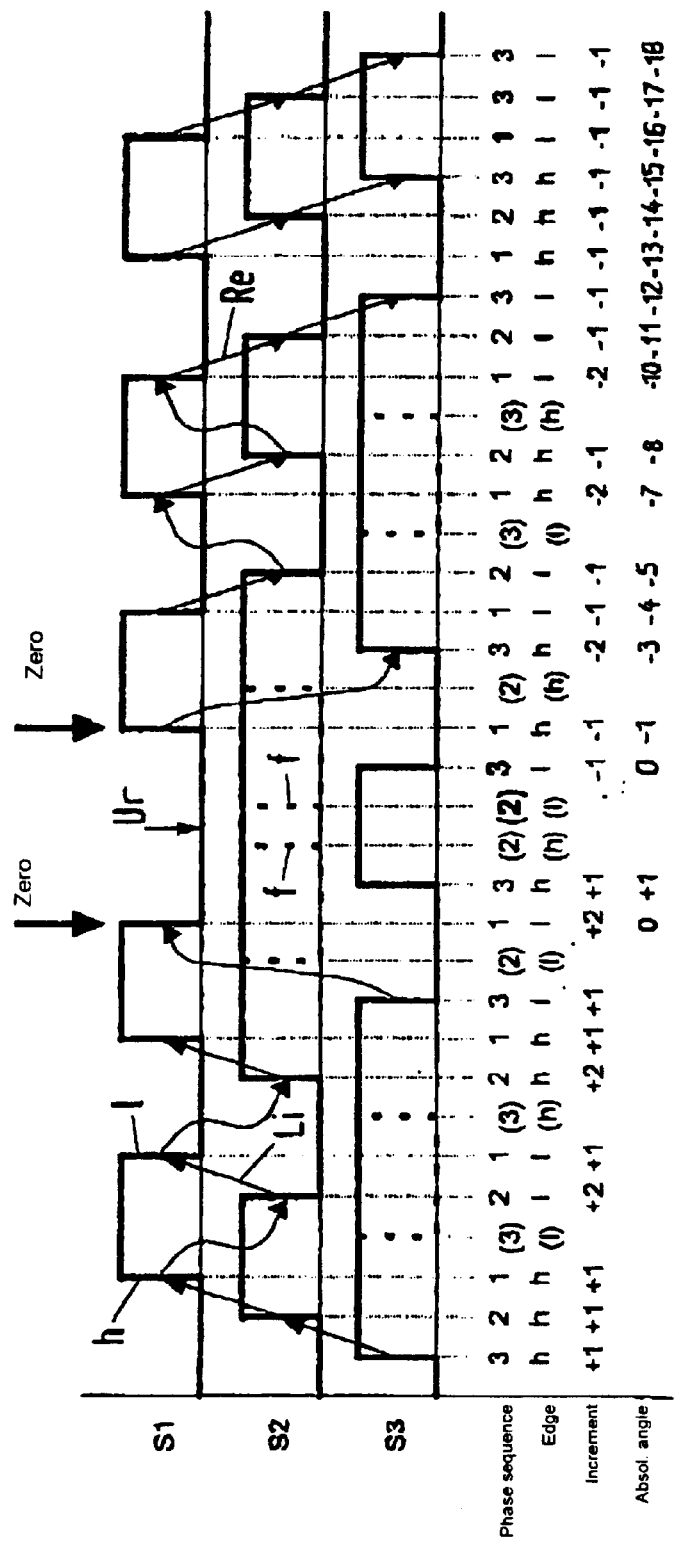

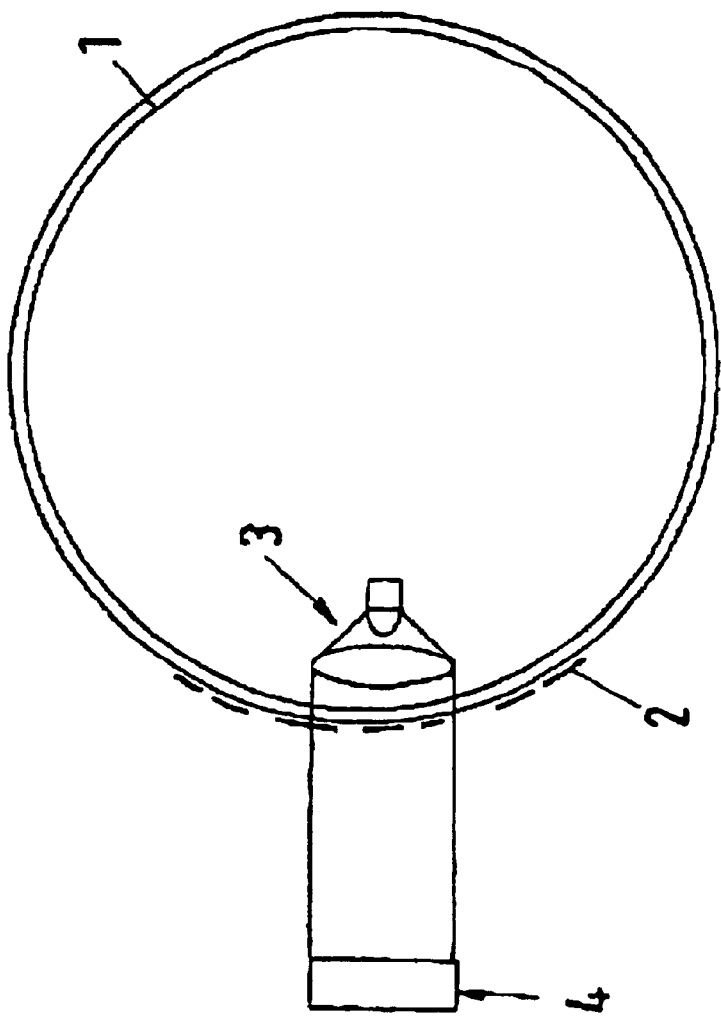

STEERING ANGLE SENSOR, SYSTEM, METHOD, AND INCREMENTAL TRACK THEREOF

A steering angle sensor for determining the steering wheel angle can include a code track assigned to a rotatable portion of the steering wheel arrangement or a fixed portion of thereof. For example, a rotor with the track can rotate together with the steering wheel, and a sensor for sensing the code track can be assigned to a fixed stator. When the sensor senses the track, it generates a signal from which the current steering angle can be determined. See for example, German patent publication DE 197 58 104 A1. Such a steering angle sensor determines the absolute value of the angle of rotation.

Alternatively, the code track may be embodied as an incremental track and an incremental signal, i.e., a signal that only identifies the change in the steering angle from the previous signal, but not the absolute value of the steering angle.

To control certain functional groups of a motor vehicle, for example the brake system, as a function of the steering angle, it is not only desirable to sense the change in the steering angle but also the absolute value of the steering angle. In this regard, it is known to arrange the steering angle sensor along an incremental track and an additional track that contains at least one reference mark, which can be used to generate a signal from which the value of the steering angle can be directly derived. The respective current steering angle can be determined with a high degree of accuracy from the combination of this reference signal with the incremental signal, which has a very high angular resolution. Such a steering angle sensor, however, is disadvantageous because it requires a more complicated design and is more expensive to manufacture than steering angle sensors based on a pure incremental measuring system. Moreover, it takes up more space.

Accordingly, there is a need for an improved, more-cost effective steering angle sensor for determining both the absolute and incremental values of the steering angle, without taking up additional space. The present invention addresses this need.

SUMMARY OF THE INVENTION

The present invention relates to a steering angle sensor, system, method, and incremental track thereof for determining the steering angle of a steering wheel.

One aspect of the present invention is the incremental track, which includes at least one reference mark for modifying an incremental signal generated by sensing the incremental track.

The track can include a plurality of spaced incremental marks arranged along a predetermined path, which can be annular. The incremental marks are configured, when sensed, to generate an incremental signal containing rise edge and a fall edge indicative of the demarcation of the incremental marks. The reference mark can be positioned or arranged between the incremental markings on the incremental track. For instance, the reference mark can be formed between an adjacent pair of the incremental markings or spacings between the incremental markings to hide the rise and fall edges of the incremental markings.

The incremental markings can be spaced apart evenly, i.e., periodically, from each other along the predetermined path or the direction in which the incremental track extends. The incremental markings can comprise a periodic bar structure, The reference mark can be identical to the incremental markings. The reference mark can be contiguous with one of the incremental markings to form a marking area having twice the width of the incremental marking. Alternatively, the reference mark can be formed between and contiguous with a pair of adjacent incremental markings to form a marking area having three times the width of the incremental marking.

The reference mark can have a same length as the incremental marks so that the reference mark extends no further than the incremental marks along a direction transverse to a direction in which the incremental track extends.

The incremental track can include alternating incremental markings, with an intermediate spacing between any adjacent pairs of the incremental markings, except where the reference mark is formed. The reference mark can be formed at at least one of the spacings or at least one of the markings.

The reference mark can be formed by converting at least one incremental marking or at least one intermediate spacing to the other. The reference mark also can be formed by replacing at least one intermediate space with the incremental marking or by replacing at least one incremental marking with an intermediate space. It can also be formed by changing the shape, extent, or structure of the incremental marking or the intermediate spacing.

Another aspect of the invention is the steering angle sensor, which can include any aspect of the incremental track described above, and a sensing device. The incremental track is configured to be associated with one of a rotatable portion and a fixed portion of a steering wheel arrangement. The steering wheel is rotatable along with the rotatable portion relative to the fixed portion.

The sensing device is for sensing the incremental track and generating incremental signals for determining the steering angle. The sensing device is configured to be associated with the other of the rotatable and fixed portions. The sensing device comprises at least two sensor elements spaced along the incremental track along the direction in which the incremental track extends. More specifically, the sensing device comprises three sensor elements serially arranged and spaced at equal distances. The sensor elements are spaced apart at a distance that is unequal to the spacing of the incremental markings.

Another aspect of the present invention is the steering angle determining system for a motor vehicle. This system can include the steering angle sensor described above having at least first and second sensor elements for generating first and second incremental signals, and an evaluator for determining the respective current steering angle based on the first and second incremental signals. The evaluator calculates the change in the steering angle based on the first and second incremental signals, and compensates the first incremental signal if the second incremental signal determines that the first incremental signal lacks an incremental signal component resulting from detecting the reference mark, which modifies the incremental signal. The evaluator determines the hidden edges based on the first and second incremental signals and compensates therefor in determining the steering angle.

Another aspect of the present invention is the method of determining the steering angle of a steering wheel in a motor vehicle. This method can involve the steps of providing the incremental track, which can be associated with one of a rotatable portion and a fixed portion of a steering wheel arrangement, providing the sensing device having at least the first and second sensor elements respectively for generating first and second incremental signals, providing at least one reference mark in the incremental track for modifying the first and second incremental signals, detecting the first and second incremental signals from the first and second sensor elements, and determining the respective current steering angle based on the first and second incremental signals. The change in the steering angle can be determined by evaluating the first and second incremental signals and compensating the first incremental signal if the second incremental signal determines that the first incremental signal lacks an incremental signal component resulting from detecting the reference mark, which modifies the incremental signal.

BRIEF DESCRIPTION OF THE INVENTION

FIG. 1 shows an incremental track with an integrated reference mark for zero point detection of the steering angle.

FIG. 1a shows an alternative embodiment of the incremental track arrangement of FIG. 1.

Figure 2:
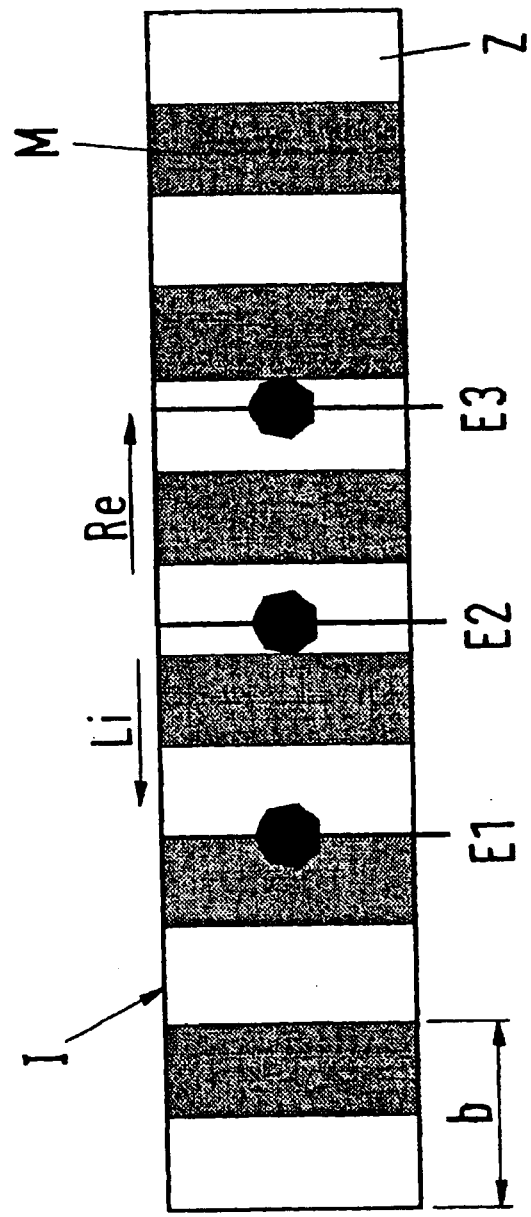
FIG. 2 shows the sensor arrangement of FIG. 1 (with the reference mark omitted for clarity) for sensing the incremental track.
Figure 3:
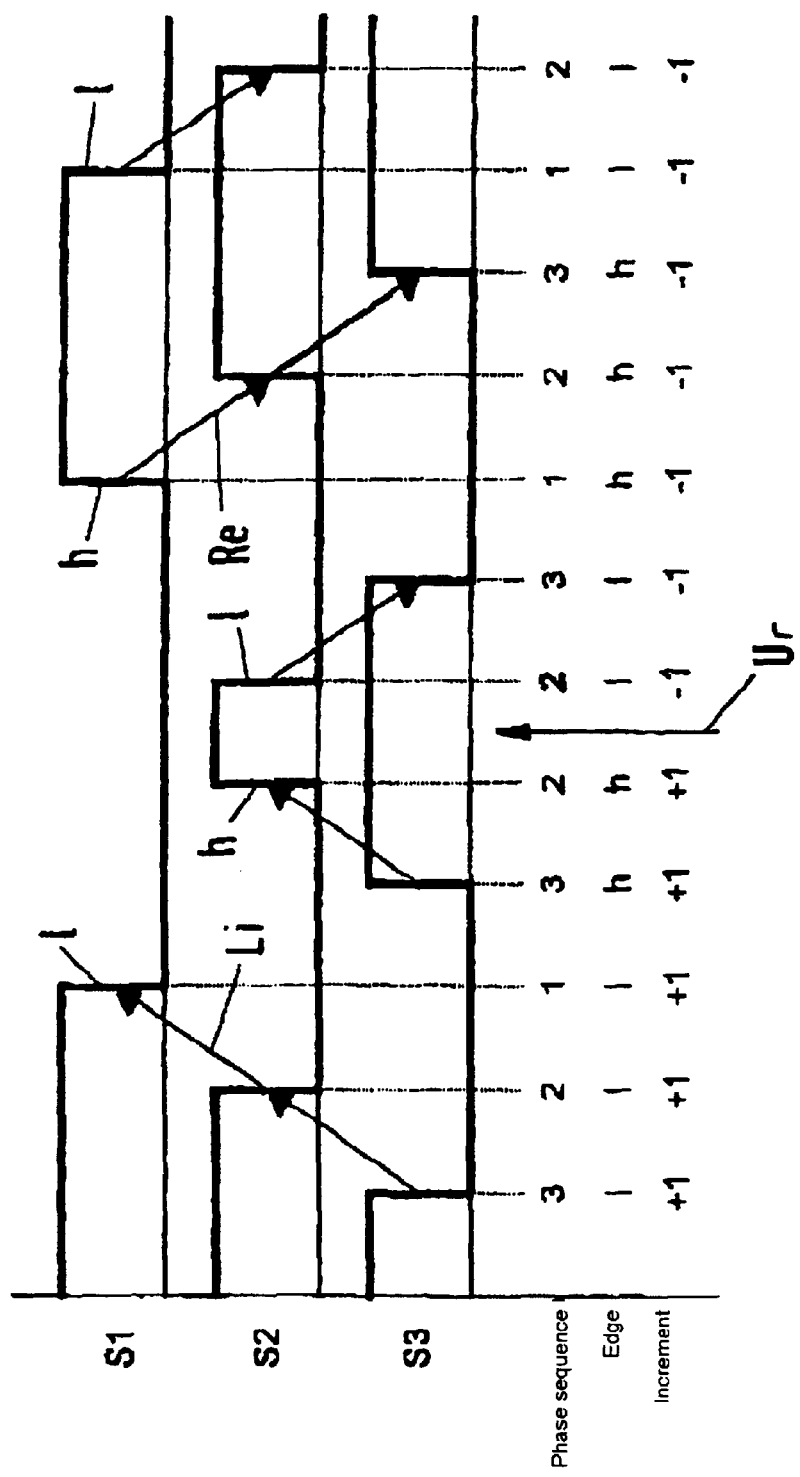

FIG. 3 schematically illustrates the sensor signals generated with the sensor arrangement of FIG. 2 when the incremental track is sensed without the reference mark.

Figure 4:
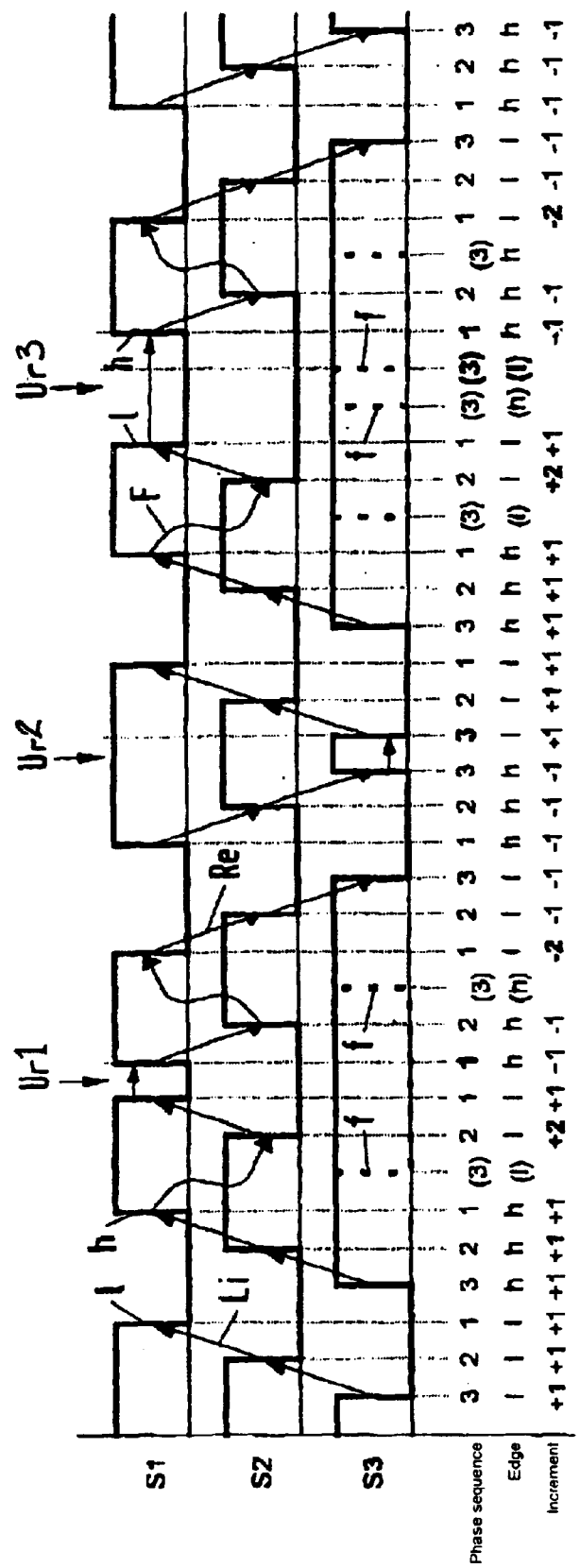

FIG. 4 schematically illustrates the sensor signals generated with the sensor arrangement of FIG. 2 with the reference mark of FIG. 1 when the steering wheel changes its direction many times during steering.

Figure 5:
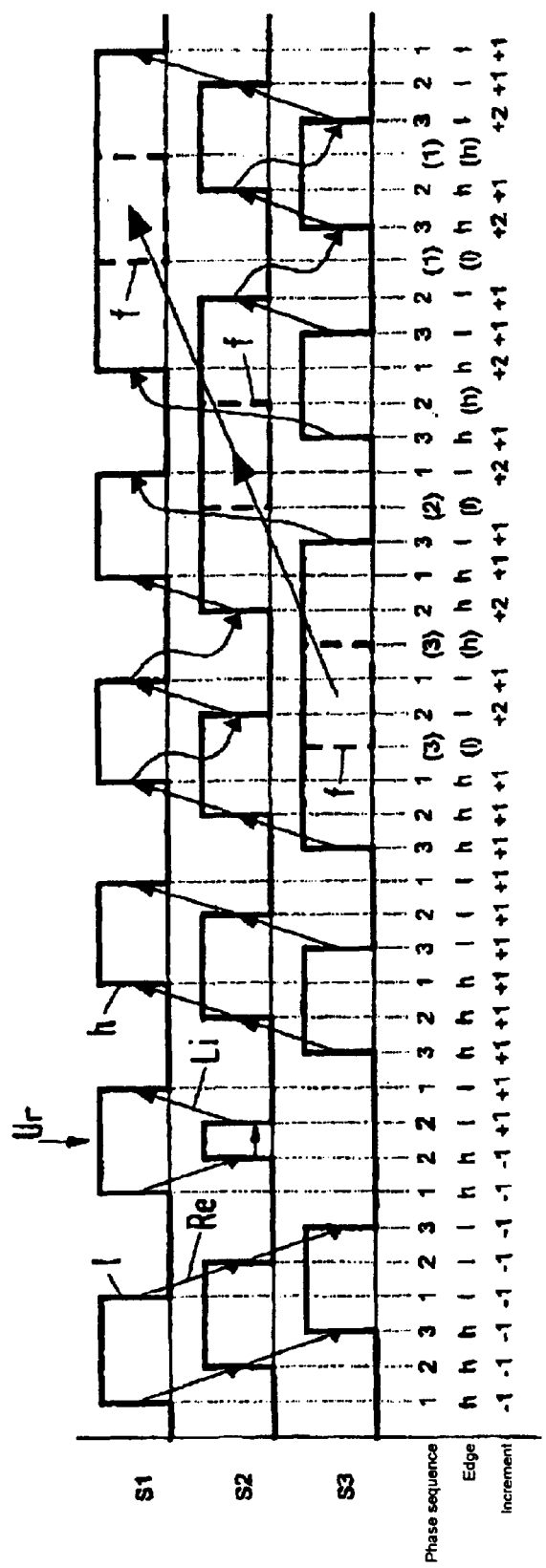

FIG. 5 schematically illustrates the sensor signals generated with the sensor arrangement of FIG. 2 with the reference mark of FIG. 1 when the steering wheel changes its rotational direction once.

Figure 6:
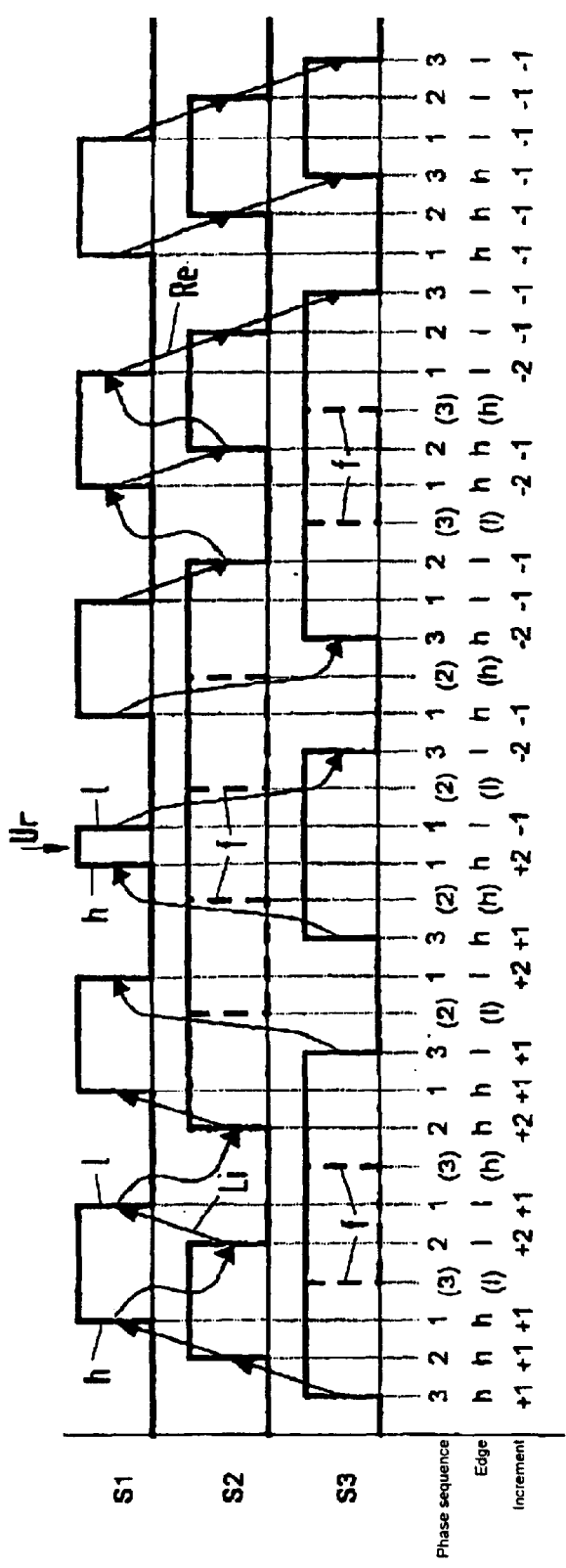

FIG. 6 schematically illustrates the sensor signals generated with the sensor arrangement of FIG. 2 with the reference mark of FIG. 1 when the steering wheel changes its rotational direction directly before a sensor element detects the reference mark.

Figure 7:
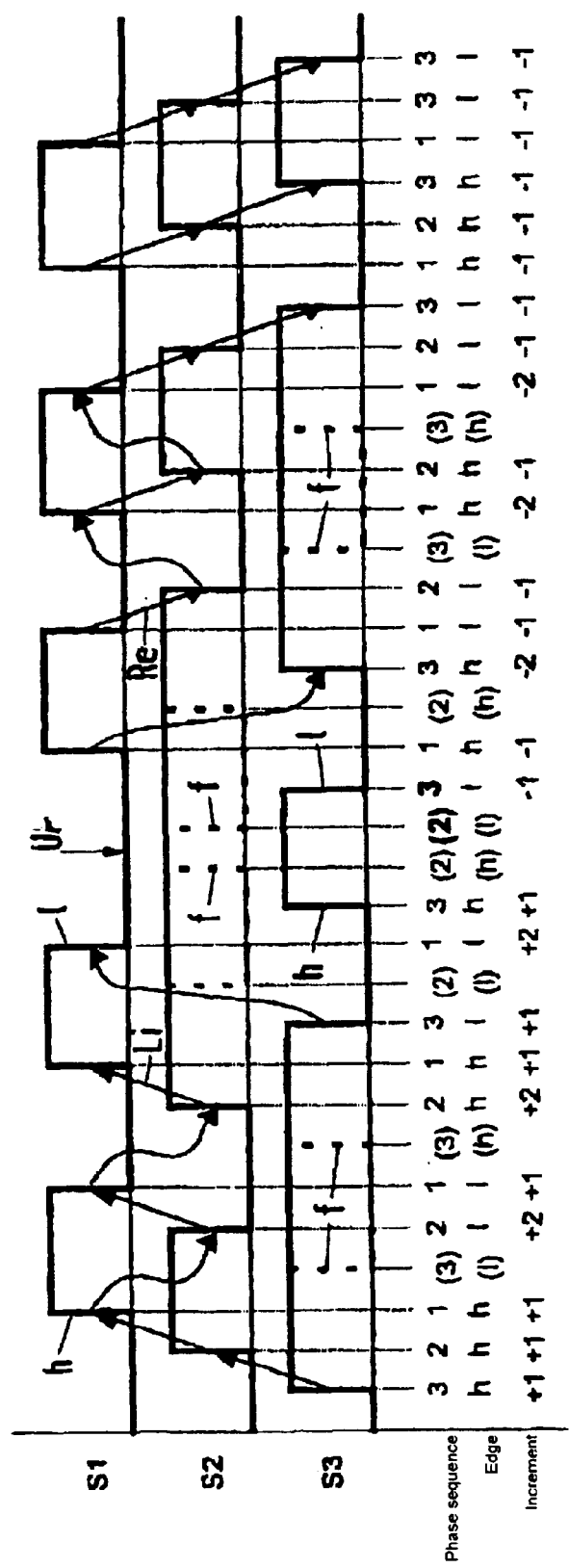

FIG. 7 schematically illustrates the sensor signals generated with the sensor arrangement of FIG. 2 with the reference mark of FIG. 1 when the steering wheel changes its rotational direction while the sensor element detects the reference mark.

Figure 8:
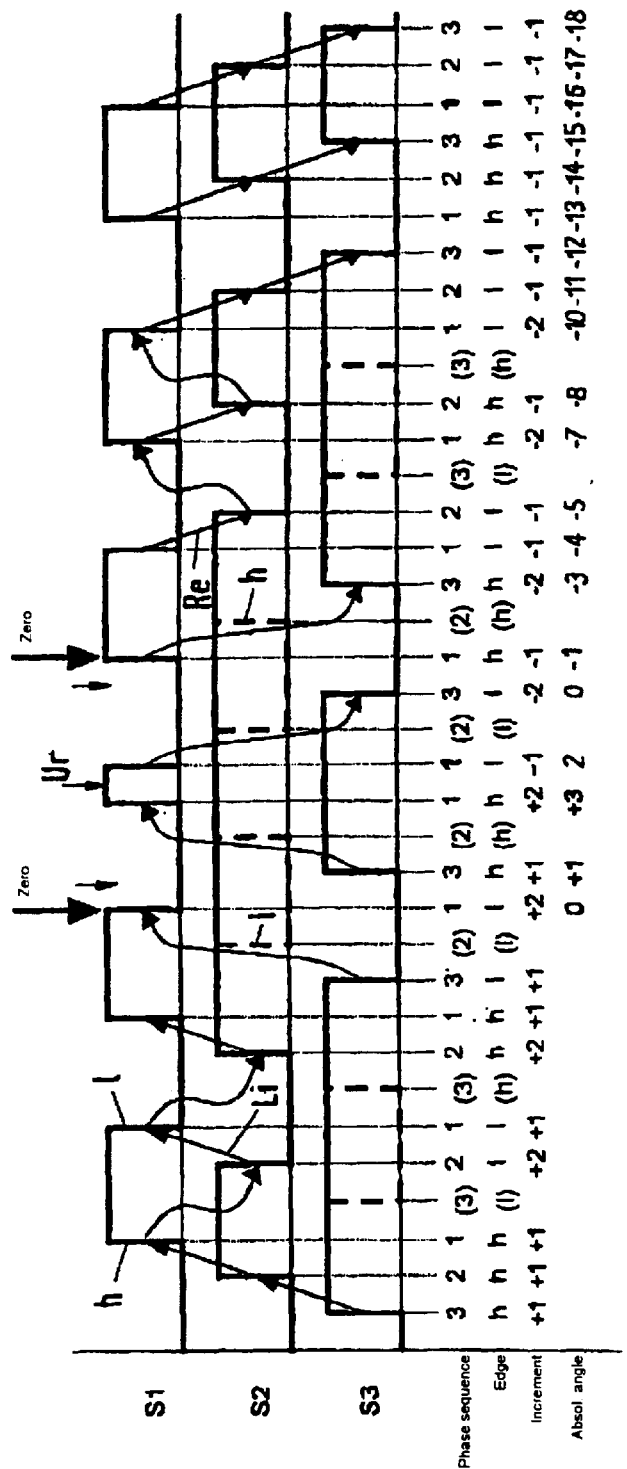

FIG. 8 schematically illustrates the sensor signals generated with the sensor arrangement of FIG. 2 with the reference mark of FIG. 1, emphasizing the detection of the zero point of the steering wheel.

FIG. 9 schematically illustrates a modification of the sensor signals of FIG. 8, detecting the zero point when the steering wheel changes its rotational direction while the sensor element detects the reference mark.

FIG. 10 schematically illustrates a conventional arrangement for determining the steering angle of a steering wheel for a motor vehicle.

DETAILED DESCRIPTION

Referring first to FIG. 10, a conventional sensor arrangement for determining the steering wheel angle includes an annular rotor 1, a code track 2, and a sensing device 3,4. The annular rotor 1 is rotatable with the steering wheel. The code track 2 can run circumferentially over a full circle, i.e., an angle of up to 360° along the annular rotor 1. Accordingly, the code track 2, together with the rotor 1, rotates along with the steering wheel. The sensing device 3, 4, which can be fixed relative to the steering wheel on a stator, senses the code track using a light transmission method. The sensing device comprises a transmitter 3 and a receiver 4 connected to an evaluation unit, for example in the form of an electronic evaluation system or a processor, i.e., CPU.

Rotor-stator systems having the code track and sensing device for determining the steering angle are described, for example, in U.S. Pat. No. 5,833,477 (which is a counterpart of German patent publication DE 195 06 865 C1), U.S. Pat. No. 6,236,119 (which is a counterpart of German patent publication DE 196 47 705 C2), and German patent publication DE 195 25 928 C1, the disclosures of which are incorporated herein by reference.

The sensing device can be easily implemented in the context of the present invention, such as a forked light barrier. A more complex sensor arrangement, such as a CCD row, for example, also can be implemented.

FIG. 1 shows an incremental track I, which can be sensed by a conventional sensor arrangement, such as the one described in FIG. 10. The present incremental track I can have a plurality of spaced markings M having the same width (a) formed along the direction of extension E of the track I. The illustrated embodiment has evenly or periodically spaced markings M (one after another) along the track. The adjacent markings can be spaced apart (i.e., intermediate spaces Z) by width (a), which is the same as the markings. The height or length (perpendicular to the width direction) of the markings M and the intermediate spaces Z, however, can be different. The markings M and the intermediate spaces can also be set at a different surface level or height. When this incremental track I is used to determine the steering angle of a steering wheel, it is to be noted that the incremental track I extends along a circular path. FIG. 1 merely schematically depicts the projection of such an incremental track I in a linear fashion for convenience of illustration.

The incremental track I can have a periodic bar structure having the markings M set at a period or interval (b). The bars all can have the same width (a) arranged serially one after another along the track at an interval (b). The reference mark R can be integrated into this track I. The width of the reference mark R illustrated in FIG. 1 can be larger (along the direction E) than the markings M of the incremental track I. Specifically, the reference mark R can be formed by covering or replacing one of the intermediate spaces Z between two adjacent markings M with an additional marking M. The reference mark R thus can comprise three markings M formed contiguously side-by-side without any intermediate space.

The reference mark R, however, can also have a different magnitude along the direction E of the incremental track I, as long as it differs from the magnitude (a) of the markings M of the incremental track I. For example, FIG. 1a illustrates a reference mark R" having a width of two markings M, which width corresponds to twice the width (a) of the markings M or of the intermediate spaces Z.

The evaluation of the signals generated by sensing the incremental track I and the reference mark R, R" is made easier if the extent of the reference mark corresponds to an integral multiple width of the markings M or the intermediate spaces Z. The present invention, however, is not restricted only to such embodiments. There are other ways of forming a reference mark other than by varying the extent of a marking, such as, for example, by changing the structure of the marking M, as illustrated in phantom (R') in FIG. 1.

The incremental track I and the additional reference mark R, R', R" can form a code track C. Such a track can be sensed to acquire both an incremental signal and absolute position information, as explained below in detail.

The incremental signal is principally defined by the signal edges, which occur when the sensing device (sensor arrangement) provided for sensing the incremental track I senses the crossovers U between the marking M and the intermediate space Z, or between the intermediate space Z and the marking M. This generates corresponding signal edges in the output signal of the sensing device. The absolute position information can be related to the latter in that, in the example illustrated in FIG. 1, two crossovers U are omitted in the reference mark R because it completely covers an intermediate space Z, i.e., has a triple width coverage.

FIG. 2 shows a sensing device in the form of a sensor arrangement having three sensor elements E1, E2, and E3 for sensing the incremental track I and the reference mark R (omitted in FIG. 2 for illustration purposes). Here, the two outer sensor elements E1 and E3 can be spaced apart to the positions defined by an equation $(n+\frac{1}{3}) \cdot b$, where n=1 from the middle sensor element E2, b designates the period of the incremental track markings M, which period constitutes an angle when the incremental track I is annular or circular. Given such an arrangement, where the two outer sensor elements E1 and E3 are each arranged at a distance from the middle sensor element E2, which is unequal to the period b of the markings M, the deviation from the period can be $\frac{1}{3}$ in the present case. The steering angles can be determined with an accuracy of b/3 by evaluating the signal edges associated with the crossovers U.

If the equation $(n+1/m) \cdot b$, where n and m are each natural numbers, is generally used for the distance between the sensor elements, in each case m different sensor elements are expediently used. The greater m is, the smaller the deviation of the distances between the individual sensor elements from the period (b), and the greater the angular resolution obtained with the sensor arrangement. But that requires a correspondingly larger number of sensor elements.

When the steering wheel rotates to the left (counterclockwise) or to the right (clockwise), the incremental track I is moved along the direction Li or Re past the sensor elements E1, E2 and E3. The sensor elements E1, E2, and E3 sense the incremental track I and generate corresponding incremental sensor signals from which the change in the steering angle can be readily calculated, as explained below.

The reference marks can be incorporated into the incremental track I for detecting a reference position, for example, the zero point of a steering wheel arrangement, independent of the physical principle in which the steering angle sensor operates. For example, the reference marks can be optimized for an optical steering angle sensor. In that case, the marks and intermediate spaces can be defined by translucent and non-translucent areas, or reflective and non-reflective areas, which can be sensed by a corresponding optical sensor arrangement, such as photoelectric barriers, CCDs, rows of diodes, rows of transistors, etc. The present invention also contemplates combining a transmitted light method and front-illumination method, for example as a function of the wavelength of the light incident on the code track at a particular time.

In the previous examples of the optical steering angle sensor, the reference mark R of FIG. 1 can be formed by, for example, replacing or covering a translucent region with a non-translucent region, or a non-reflective region with a reflective region, or vice versa. Alternatively, a plurality of translucent marks or non-translucent intermediate spaces can be formed serially one after the other to form the incremental track, so that the incremental track can be sensed using the transmitted light method, and to make a region of the incremental track reflective as the reference mark so that it can be sensed using the front-illumination method.

In addition, the steering angle sensor can be based on a magnetic principle, for example in the form of a multi-pole ring detectable by Hall sensors, and can have markings in the form of north poles and associated intermediate spaces in the form of south poles, or vice-versa, or in the form of an arrangement based on a magnetoresistive principle. In the same way, the invention can also be applied to inductive steering angle sensors and to the other known, customary physical principles suitable for forming a steering angle sensor.

The reference mark R, R', R" integrated into the incremental track according to the present invention adds a reference position, which beneficially brings about a local modification of the output signal generated by sensing device. The integration of the reference mark between its markings allows the incremental track to have essentially the same length (extent transversely to its direction of extension) in the region of the reference mark as in the other regions. This means that the reference mark can be integrated directly into the incremental track so that the outer contour of the incremental track does not change by the additional reference mark. In particular, the reference mark does not need to protrude (radially when the track is circular) beyond the incremental track transversely with respect to the direction in which the incremental track extends.

The reference marks R illustrated in FIGS. 1 and 1a are just several of many possible ways of locally modifying the signal generated when the code track C is sensed. To form the code track C according to the present invention, at least one irregularity in the form of any desired reference mark, by means of which the period of the incremental track can be disrupted at a location (or if appropriate at different locations), is integrated into the periodically configured incremental track I. A reference position (for example the zero point corresponding to straight-ahead travel of the vehicle) can be emphasized by means of this reference mark (or if appropriate by a plurality of reference marks) to permit absolute positions to be determined.

In an alternative embodiment, the reference mark can be formed by partially covering the space Z (as illustrated as R' in phantom in FIG. 1) or the marking M of the incremental track I, or alternatively partially covering both the marking M and the adjacent intermediate space Z. The specific configuration of the reference mark here does not, of course, necessarily need to be embodied by replacing an intermediate space or a part thereof with a marking, or by replacing a marking or a part thereof with an intermediate space. Indeed, the reference mark can equally well have a structure that differs completely from either the markings or the intermediate spaces. Thus, for example, in the case of an incremental track that can be sensed using the transmitted light method, the reference mark can be formed by a reflective region that can be sensed using the front-illumination method.

Moreover, given an incremental track that can be sensed using the transmitted light method, at least one of the translucent regions of the code track can have a different degree of translucency from other markings of the incremental track. Similarly, the reference mark can be integrated into an incremental track that can be sensed using the front-illumination method, by virtue of the fact that one of the reflective regions forming the marks of the code track has a different reflectivity from the rest. In an incremental track that can be sensed magnetically and composed of a periodic arrangement of north and south poles, a nonmagnetic section can form the reference mark, for example.

In addition, the embodiment of the invention illustrated in FIGS. 1, 1a, and 2 also can use different sensing arrangement that senses the code track. Thus, for example, both the number and the spacing or location (or both) of the sensor elements for sensing can be different.

The determination of the steering angle in a steering wheel arrangement according to the embodiments of FIGS. 1 and 2 follows, illustrated using three sensor elements E1, E2, and E3, which can be photoelectric barriers, as an example.

FIG. 3 illustrates the output signals S1, S2, and S3 from the three sensor elements E1, E2, and E3 sensing a pure incremental track I without any reference mark R. Here, each of the output (sensor) signals of the individual sensor elements comprises a sequence of pulses having a rising edge h, a falling edge 1, and a plateau section that adjoins the rising and falling edges h, 1. For purposes of present illustration, arrows Re extending obliquely downward has been designated as the steering wheel rotating to the right (clockwise). The steering wheel is deemed rotating clockwise when all three sensor elements E1, E2, and E3 output rising edges h in succession, first from the sensor element E1, then from the sensor element E2, and thereafter from the sensor element E3. Rising arrows Li have been designated as the steering wheel rotating to the left (counterclockwise). Here, the sequence is reversed. The steering wheel is deemed rotating counterclockwise when all three sensor elements output falling edges 1 in succession, first from the sensor element E3, then from the middle sensor element E2, and thereafter from the sensor element E1. By evaluating the sensor signals S1, S2, and S3 corresponding to the first, second, and third sensor elements E1, E2, and E3, the current direction of rotation of the steering wheel can be sensed at any time. It should be noted that the clockwise and counterclockwise designations can be reversed, i.e., succession of falling edges 1 designated for clockwise direction and succession of rising edges h designated for counterclockwise direction.

To facilitate the assignment of the sensor signals S1, S2, and S3, FIG. 3 identifies the rising edge h or falling edge 1 simply as 1, 2, and 3, and h and 1 corresponding to the sensor elements E1, E2, and E3 in the "phase sequence" and "edge" lines. In the case of a rising edge h, which can be assigned as a counterclockwise (left) steering wheel rotation, the current steering angle is increased by a specific absolute amount, which is indicated in each case by the symbol +1 in the "increment" line of FIG. 3. Correspondingly, the current steering angle is reduced by that value if one of the edges 1, h is assigned to a clockwise (right) steering wheel rotation, which is indicated in each case by the symbol −1 in the "increment" line of FIG. 3.

The reversal of the steering wheel rotation can be identified when the same sensor element E1, E2, or E3 generates both signal edges h, 1 or 1, h in succession. Because the signal edges h, 1 reflect the crossovers U between the markings M and intermediate spaces Z of the incremental track I illustrated in FIG. 2, it is also possible to detect, with reference to the signal edges, the last crossover U detected by a sensor element during the rotation of the steering wheel in a specific direction, as the crossover in which the corresponding sensor element last detected when the steering wheel rotates in the opposite direction.

The reversal of the steering direction identified this way is indicated in FIG. 3 with the arrow Ur. The exemplary embodiment according to FIG. 3 depicts the steering wheel reversing its rotational direction in association with the sensor element E2. The reversal is identified when the output signal S2 contains one of the rising and falling edges h, 1 and the other of the falling and rising edges 1, h before one of the other sensor signals S1, S3 contains a signal edge h, 1. The sign of the absolute value is reversed directly after the reversal is identified to change the steering angle at each occurring edge.

FIGS. 4 and 5 illustrate the signal profiles of the output signals S1, S2, and S3 from the sensor elements E1, E2, and E3 for typical steering movements when the code track C includes a reference mark R. In this case, the individual edges f that otherwise would have been present had it not been for the reference mark R are illustrated in phantom. One of the sensor signals S1, S2, and S3 always contains the dropped edges f whenever the reference mark R moves past the corresponding sensor element E1, E2, and E3. In the embodiment of FIG. 1, the reference mark R can be formed by covering, replacing, or converting one of the intermediate spaces Z of the incremental track I with an additional marking M. Accordingly, the reference mark R area can be identified by three consecutive side-by-side adjacent markings, in which two crossovers between the marking M and the intermediate space Z drop or are hidden, causing the corresponding signal edges f to drop. The changes to the structure of the signal leading to the drop and/or the displacement of signal edges can also be achieved with other configurations of the reference mark, in particular in terms modifying its width.

Referring to FIG. 4, the signal edges f that drop can be subsequently detected with the output signals of the other sensor elements. The signal edge f that dropped from the sensor signal S3 just before the first reversal Ur1 of direction is an example of this. Here, the first sensor signal S1 detects a reversal Ur1, by detecting a falling edge 1 followed by a rising edge h in the first signal S1 before the other two signals S2, S3 detect a falling or rising edge. When the dropped signal edge f in the third signal S3, i.e., detecting the reference mark R, the steering wheel was rotating counterclockwise (left). When the steering wheel is rotating counterclockwise, the sensor elements E1, E2, E3 generate the signal edges h, 1 in succession from E3–E1 so that the third signal S3 first detects the corresponding signal edge h, 1, then the second signal S2 detects the same, and then finally the first sensor signal S1 detects the same.

Referring to FIG. 4, three falling edges 1, and then three rising edges h occurred first in this order in the sensor signals. Thereafter, there is a crossover in the third signal S3 so that the second signal S2 contains the first falling edge 1 instead of the third signal S3, followed by the falling edge in the first signal S1. Since the third signal S3 did not contain the falling edge 1 before the falling edge 1 in the second signal S2, it becomes apparent that the third sensor element E3 was detecting the reference mark and that the falling edge 1 has been dropped from the third signal S3. Because of the edge drop detection in one of the signals S1 to S3, the change in the steering angle, which is also tied to this signal edge, also drops. The change in the steering angle follows the edge drop detection, and thus must be recorded immediately after its detection. This can be done by identifying the value of the steering angle after detecting the edge drop from a signal S1–S3 so that it has the value that it would have had if the corresponding signal edge had not dropped.

The first signal edge f dropped in FIG. 4 is, for example, a signal edge that would have occurred during a rotation of the steering wheel to the left. Correspondingly, there would have been an increase in the steering angle by the above-mentioned constant value. This steering angle increase can be compensated by doubling the value (+/−2) (for the mark and spacing having the same width as illustrated in FIGS. 1–3, to account for the dropped edge and the increase in the steering angle following the dropped edge. This includes the increased/decreased steering angle due to the current signal edge and also the increased/decreased steering angle due to the previously dropped edge.

Those passages in the individual sensor signals S1 to S3 requiring subsequent compensation of the steering angle due to a dropped signal edge f are identified in FIGS. 4 and 5 with a curving arrow F. In addition, it becomes clear from FIG. 5 how the dropped signal edges f occur successively in the individual sensor signals S3, S2, S1 when the reference mark R successively passes the sensor elements E3, E2, and E1.

The subsequent compensation for the dropped signal edges f can also aid in detecting a steering wheel rotation reversal. This applies particularly when the steering wheel rotation reverses directly after the signal edge f drops. For example, in the third reversal Ur3 in the direction of rotation, as illustrated in FIG. 4, the direct succession of two consecutive edges in the same sensor signal did not occur in the third signal S3 because the corresponding edges thereof dropped. This is because the reversal Ur3 in the direction of rotation took place when the reference mark R modified the third sensor signal S3 by hiding the individual signal edges f. In this case, the reversal Ur3 was not detected until later by two consecutive signal edges 1, h contained in the first sensor signal S1 following the dropped signal edges f.

When the sensor signals S1 to S3 are evaluated with a suitable electronic system based on the present principles illustrated above, it becomes clear that the reversal signal edges of the third sensor signal S3 have to be located between the reversal signal edges 1, h of the first sensor signal S1 in the vicinity of the actual reversal Ur3 of the rotation. The subsequent reconstruction of these signal edges makes it possible to determine that the reversal Ur3 of the direction of rotation occurred between the two dropped signal edges f of the third sensor signal S3. This can then be taken into account accordingly in determining the current steering angle. In particular, the necessary change of sign takes place during the addition or subtraction of the respective value of the change in the steering angle.

If another width or position or both of the reference mark R is selected, the evaluation principles explained above can also be correspondingly applied.

FIG. 6 shows the sensor signals S1 to S3 where the steering wheel reverses rotation at Ur, after one of the sensor signals (S1 here) contains the signal edge (rising edge h here). In this case, the reversal Ur of the direction of rotation is detected directly from the fact that the next registered edge (1) occurs next at the same sensor signal (S1), as explained previously.

If the reference mark R is currently in the region of one of the other sensor elements (the second sensor element E2 here) at the same time, so that the corresponding sensor signal (S2) lacks the edges f (dropped edges), the corresponding the current value of the steering angle must be corrected during the subsequent detection of the dropped edges, taking into account the change of sign caused by the change in the direction of rotation.

FIG. 7 once more illustrates the sensor signals S1 to S3 where the steering wheel reverses rotation at Ur, while the reference mark of one of the sensor elements, namely the second sensor element E2, is passing so that the reversal Ur of the rotation is not initially registered due to dropped signal edges. Instead, the reversal Ur is registered from consecutive edges h, 1 of the third sensor signal S3 based on the same principles explained before. The reversal Ur subsequently detected is then, of course, taken into account in the further evaluation of the sensor signals, particularly in determining the respective current steering angle.

The detection of the reference point or zero point (zero) is illustrated in FIG. 8 both for counterclockwise (left) rotation, as identified by the obliquely rising arrows Li, and for clockwise (right) rotation, as identified by the obliquely dropping arrows Re). Because the zero point corresponds to a position of the steering wheel arrangement at which the reference mark R is covered by the second, middle sensor element E2, the zero point during movement of the steering wheel to the left or to the right is detected when either the falling or rising edge 1, h drops from the second sensor signal S2. In such a case, the zero point (zero) will be detected after a short delay, as illustrated FIG. 9, if the zero point passes through directly after a change in direction Ur, which was detected after a short delay owing to the dropped signal edges f.

FIGS. 8 and 9 also show that starting from the first determination of the zero point, it is now possible to specify not only a change in the current steering angle ("increment"), but also an absolute value of the steering angle ("absolute angle"). Since the steering wheel moves at least once to the zero position (corresponding to straight-ahead travel) during normal driving, even after a very short time, the calculation of the absolute steering angle while the vehicle operates can start very early so that the absolute steering angle can be subsequently made available at any time, for example for driving stability systems of the motor vehicle.

The evaluation method described above also can be supplemented with additional sensors specifically for finding the reference mark or for increasing the accuracy or resolution. In addition, both the detectability of the reference mark and the resolution of the entire arrangement can be improved by carrying out sensing over a relatively large area, for example by means of a CCD row, instead of point sensing of the code track (C) by means of a photoelectric barrier or the like.

In sum, according to the present invention, at least one reference mark is formed locally in the incremental track. The reference mark modifies the signal generated by sensing the incremental track. By virtue of the signal being modified locally on the basis of the at least one reference mark at one location or at a plurality of locations, the incremental signal now additionally contains absolute position information with respect to the steering angle. This additional absolute position information can be acquired without additional installation space for the steering angle sensor because the at least one reference mark used to acquire the absolute position information is integrated into the incremental track itself. Moreover, no additional reference track arranged next to the incremental track is necessary according to the present invention for acquiring the absolute position information.

The steering angle sensor according to the invention can be therefore compact in design in comparison with such known measuring systems. In addition to an incremental measuring arrangement used for accurately determining positions with a high degree of angular resolution, the reference track permits absolute position information.

In the steering angle sensor according to the invention, the reference mark is preferably designed for particularly space-saving integration into the incremental track in such a way that it does not protrude beyond the code track transversely to the direction in which the code track extends. This ensures that the acquisition of the absolute position information does not require any additional installation space for the steering angle sensor.

It is advantageous to have one sensor element assigned to the zero point, i.e., the steering wheel is located in a central position (corresponding to straight-ahead travel) when this sensor element detects the reference mark. Other reference positions, however, are of course also possible.

Other sensor elements are preferably arranged on both sides of the zero position, each at an interval (n+x)·b, where n is a natural number and x<1, and b refers to the period of the incremental track. At any rate, to evaluate the signals, at least two sensors should be spaced at a distance from one another that is unequal to an integral multiple of the period of the incremental track.

When a reference mark is integrated into an incremental track, the resolution of the incremental signal is reduced locally (specifically in the region in which the incremental signal is modified on the basis of the reference mark). In particular, the local modification of the signal generated by a sensor element when the incremental track is sensed, and which is due to the integration of the reference mark into the incremental track, can cause the evaluation of the signal generated by the sensor element to yield a false value of the steering angle. A different value for the steering angle would therefore be obtained than when an incremental track that does not have a reference mark is sensed. To overcome this problem, the sensing device can have at least two sensor elements for sensing the code track. The respective current steering angle can be determined from the signals fed to an evaluation device based on each characteristic signal generated by sensing the incremental track. The change in the steering angle determined by evaluating the first signal generated by a sensor element can be corrected if it is determined, by evaluating the second signal generated by another sensor element, that a value of the steering angle determined from the first signal is false as a result of the local modification of the signal on the basis of the reference mark.

In the case where a reference mark whose extent differs from the extent of the regular markings or intermediate spaces of the incremental track (for example because the reference mark is formed by the complete coverage of an intermediate space between two markings of the incremental track by additional marking or by the omission of a marking between two intermediate spaces) is integrated into the incremental track, in each case, individual edges of the incremental signal are suppressed in the vicinity of the reference mark. These suppressed signal edges are subsequently included in the determination of the steering angle again after the reference mark has been detected as such. Here, for example, the signals generated by at least one further sensor element can be evaluated and used to correct or compensate the signal. The precise sequence of the correction depends on the extent of the reference mark.

The disclosure of the German priority application, DE 100 41 507 filed Aug. 11, 2000, in its entirety, including the drawings, claims, and the specification thereof, is incorporated herein by reference.

I claim:

1. A steering angle sensor for motor vehicles for determining the steering angle of a steering wheel, comprising:

an incremental track configured to be associated with one of a rotatable portion and a fixed portion of a steering wheel arrangement, wherein the steering wheel is rotatable along with the rotatable portion relative to the fixed portion;

a sensing device for sensing the incremental track, wherein the sensing device is configured to be associated with the other of the rotatable and fixed portions, wherein the sensing device generates incremental signals for determining the steering angle, wherein the incremental track includes at least one reference mark for modifying the incremental signals.

2. A steering angle sensor for motor vehicles for determining the steering angle of a steering wheel, comprising:

an incremental track configured to be associated with one of a rotatable portion and a fixed portion of a steering wheel arrangement, wherein the steering wheel is rotatable along with the rotatable portion relative to the fixed portion;

a sensing device for sensing the incremental track, wherein the sensing device is configured to be associated with the other of the rotatable and fixed portions, wherein the sensing device generates incremental signals for determining the steering angle, wherein the incremental track includes at least one reference mark for modifying the incremental signals, and wherein the incremental track includes a plurality of incremental markings spaced from each other periodically along the direction in which the incremental track extends.

3. A steering angle sensor according to claim 2, wherein the incremental markings comprise a periodic bar structure.

4. A steering angle sensor according to claim 2, wherein the reference mark is arranged between the incremental markings on the incremental track.

5. A steering angle sensor according to claim 4, wherein the reference mark is identical to the incremental markings.

6. A steering angle sensor according to claim 5, wherein the reference mark is contiguous with one of the incremental markings to form a marking area having twice the width of the incremental marking.

7. A steering angle sensor according to claim 5, wherein the reference mark is formed between and contiguous with a pair of adjacent incremental markings to form a marking area having three times the width of the incremental marking.

8. A steering angle sensor for motor vehicles for determining the steering angle of a steering wheel, comprising:

an incremental track configured to be associated with one of a rotatable portion and a fixed portion of a steering wheel arrangement, wherein the steering wheel is rotatable along with the rotatable portion relative to the fixed portion;

a sensing device for sensing the incremental track, wherein the sensing device is configured to be associated with the other of the rotatable and fixed portions, wherein the sensing device generates incremental signals for determining the steering angle, wherein the incremental track includes at least one reference mark for modifying the incremental signals, and wherein the reference mark has a same length as the incremental marks so that the reference mark extends no further than the incremental marks along a direction transverse to a direction in which the incremental track extends.

9. A steering angle sensor for motor vehicles for determining the steering angle of a steering wheel, comprising:
   an incremental track configured to be associated with one of a rotatable portion and a fixed portion of a steering wheel arrangement, wherein the steering wheel is rotatable along with the rotatable portion relative to the fixed portion;
   a sensing device for sensing the incremental track, wherein the sensing device is configured to be associated with the other of the rotatable and fixed portions, wherein the sensing device generates incremental signals for determining the steering angle,
   wherein the incremental track includes at least one reference mark for modifying the incremental signals, and
   wherein the incremental track includes an alternating incremental markings, with an intermediate spacing between any adjacent pairs of the incremental markings, except where the reference mark is formed.

10. A steering angle sensor according to claim 9, wherein the reference mark is formed at at least one of the spacings or at least one of the markings.

11. A steering angle sensor according to claim 10, wherein the reference mark is formed by converting at least one incremental marking or at least one intermediate spacing to the other.

12. A steering angle sensor according to claim 9, wherein the reference mark is formed by changing the shape, extent, or structure of the incremental marking or the intermediate spacing.

13. A steering angle sensor according to claim 9, wherein the reference mark is formed by replacing at least one intermediate space with the incremental marking or by replacing at least one incremental marking with an intermediate space.

14. A steering angle sensor according to claim 9, wherein the sensing device comprises at least two sensor elements spaced along the incremental track along the direction in which the incremental track extends.

15. A steering angle sensor according to claim 14, wherein the sensing device comprises three sensor elements serially arranged and spaced at equal distances.

16. A steering angle sensor according to claim 15, wherein at least two of the sensor elements are spaced apart at a distance that is unequal to the spacing of the incremental markings.

17. A method of determining the steering angle of a steering wheel in a motor vehicle, comprising the steps of:
   providing an incremental track associated with one of a rotatable portion and a fixed portion of a steering wheel arrangement;
   providing a sensing device having at least first and second sensor elements respectively for generating first and second incremental signals;
   providing at least one reference mark in the incremental track for modifying the first and second incremental signals;
   detecting the first and second incremental signals from the first and second sensor elements; and
   determining the respective current steering angle based on the first and second incremental signals,
   wherein the change in the steering angle is determined by evaluating the first and second incremental signals and compensating the first incremental signal if the second incremental signal determines that the first incremental signal lacks an incremental signal component resulting from detecting the reference mark, which modifies the incremental signal.

18. A method of determining the steering angle of a steering wheel in a motor vehicle, comprising the steps of:
   providing an incremental track associated with one of a rotatable portion and a fixed portion of a steering wheel arrangement;
   providing a sensing device having at least first and second sensor elements respectively for generating first and second incremental signals;
   providing at least one reference mark in the incremental track for modifying the first and second incremental signals;
   detecting the first and second incremental signals from the first and second sensor elements; and
   determining the respective current steering angle based on the first and second incremental signals,
   wherein the change in the steering angle is determined by evaluating the first and second incremental signals and compensating the first incremental signal if the second incremental signal determines that the first incremental signal lacks an incremental signal component resulting from detecting the reference mark, which modifies the incremental signal, and
   wherein the incremental track comprises a plurality of evenly spaced incremental marks that enable the first and second sensor elements to generate the first and second incremental signals having a rise edge and fall edge indicative of the demarcation of the incremental marks.

19. A method according to claim 18, wherein the reference mark is positioned between an adjacent pair of the incremental markings or spacing between the incremental markings, to hide the rise and fall edges thereof, and wherein the hidden edges are determined and compensated for in determining the steering angle.

20. A steering angle determining system for a motor vehicle, comprising:
   an incremental track configured to be associated with one of a rotatable portion and a fixed portion of a steering wheel arrangement, wherein the steering wheel is rotatable along with the rotatable portion relative to the fixed portion;
   a sensing device for sensing the incremental track, wherein the sensing device is configured to be associated with the other of the rotatable and fixed portions, wherein the sensing device has at least first and second sensing elements for generating at least first and second incremental signals from detecting the incremental track,
   wherein the incremental track includes at least one reference mark for modifying the first and second incremental signals; and
   an evaluator for determining the respective current steering angle based on the first and second incremental signals,
   wherein the evaluator calculates the change in the steering angle based on the first and second incremental signals, and compensating the first incremental signal if the second incremental signal determines that the first incremental signal lacks an incremental signal component resulting from detecting the reference mark, which modifies the incremental signal.

21. A steering angle system for a motor vehicle, comprising:
- an incremental track configured to be associated with one of a rotatable portion and a fixed portion of a steering wheel arrangement, wherein the steering wheel is rotatable along with the rotatable portion relative to the fixed portion;
- a sensing device for sensing the incremental track, wherein the sensing device is configured to be associated with the other of the rotatable and fixed portions, wherein the sensing device has at least first and second sensing elements for generating at least first and second incremental signals from detecting the incremental track,
- wherein the incremental track includes at least one reference mark for modifying the first and second incremental signals; and
- an evaluator for determining the respective current steering angle based on the first and second incremental signals,
- wherein the evaluator calculates the change in the steering angle based on the first and second incremental signals, and compensating the first incremental signal if the second incremental signal determines that the first incremental signal lacks an incremental signal component resulting from detecting the reference mark, which modifies the incremental signal, and
- wherein the incremental track comprises a plurality of evenly spaced incremental marks that enable the first and second sensor elements to generate the first and second incremental signals having a rise edge and a fall edge indicative of the demarcation of the incremental marks.

22. A system according to claim 21, wherein the reference mark is positioned between an adjacent pair of the incremental markings or spacing between the incremental markings, to hide the rise and fall edges thereof, and wherein the evaluator determines the hidden edges based on the first and second incremental signals and compensates therefor in determining the steering angle.

23. An incremental track for indicating a steering angle of a steering wheel, comprising:
- a plurality of evenly spaced incremental marks arranged along a predetermined path, the incremental marks being configured, when sensed, to generate an incremental signal containing rise edge and a fall edge indicative of the demarcation of the incremental marks; and
- a reference mark positioned between an adjacent pair of the incremental markings for hiding the rise and edge of the incremental signal.

24. An incremental track according to claim 23, wherein the predetermined path is annular.

* * * * *